Patented Feb. 19, 1946

2,395,061

UNITED STATES PATENT OFFICE 2,395,061

STABILIZING ICE-CREAM COMPOSITIONS

Sidney Musher, New York, N. Y., assignor to Musher Foundation Incorporated, New York, N. Y., a corporation of New York No Drawing. Application August 1, 1944, Serial No. 547,625

13 Claims. (Cl. 99—136)

The present invention relates to an ice cream stabilizer and ice cream composition and particularly relates to a stabilized ice cream composition having unusually fine body and texture whereby fast overrun is produced and whereby relatively large proportions of egg yolk are replaced in the ice cream mix.

The present ice cream composition also has a relatively high viscosity when in liquid or melted condition as well as good body and texture and is resistant to formation of ice or lactose crystals when held at freezing temperatures such as in dealers' ice cream cabinets.

In producing ice cream of desirable body and texture it has been customary to utilize various ingredients or combinations thereof such as gelatin, sodium alginate, algin, Irish moss and psyllium seed and, to a lesser extent, products of the nature of gum tragacanth and India gum. Furthermore, in producing sherbets and ices, it has been customary to utilize pectin and agar as well as the above.

These materials are not only quite expensive but in some cases are even objectionable for addition to ice cream because of Federal and State regulations and the amount which must be added is limited by such regulations.

Furthermore, it is difficult to obtain in an ice cream a combination of characteristics necessary for the production of the highest grade ice cream, such as proper viscosity, as well as resistance to formation of ice and lactose crystals upon holding in dealers' cabinets, good body and texture, proper "chewing" qualities and proper over-run and air incorporation within the time limits normally set for freezing. This problem is a special one in the ice cream industry as viscosity alone or gum action alone which might be sufficient for an ordinary food product is not sufficient for ice cream as ice cream presents special and peculiar problems limited to the ice cream industry.

For example, sodium alginate is being widely used as a stabilizer in the manufacture of ice cream, but has the decided disadvantage of producing in the freshly made mix a viscosity that is much too high and consequently when the ice cream mix is passed over the cooler following pasteurization and homogenization there is danger of physical thickening of the mix on the cooling coils and in the storage tank.

On the other hand, other stabilizers may have a desirable viscosity but do not have the proper action in retarding ice and lactose crystal formation so that it is difficult to obtain from a gum or stabilizer ingredient a composite of the desirable characteristics which are needed to produce an ice cream having a high score, body and texture.

An object of the present invention is therefore to provide a stabilizer and ingredient for ice cream which will supply at low cost to an ice cream good body, texture and viscosity, resistance to ice and lactose crystal formation, as well as other desirable physical characteristics, together with extremely rapid overrun, shortened agitation time and replacement for egg yolk.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

It has now been found that when a combination is made of a special oat fraction and a mono glyceride or di glyceride or a polyhydric alcohol in which at least one of the hydroxyl groups is free and in which at least one of the hydroxyl groups is replaced by a fatty acid radical, that this combination when used as an ingredient and stabilizer in an ice cream mix gives such ice cream fast overrun, replacing egg yolk and produces a high score, providing excellent body, texture and viscosity and being effective in reducing ice and lactose crystal formation so that the ice cream will stand up for a long period of time in the dealers' cabinets and in the manufacturing plant.

The special oat fraction utilized in accordance with the procedures of the present invention is a fraction which is different from the oat grain as a whole or from oat flour made by grinding oat groats. These properties are only developed when a special fraction of the oat grain is removed from the balance of the oat grain.

This special oat fraction is a relatively low starch, relatively high protein fraction which may be obtained after removal of the cellulosic hulls of the oats and after removal of a large portion of the relatively high starch fraction.

This particular fraction of oats is best prepared by first milling the oats to remove the cellulosic hulls leaving the oat groats. These oat groats are then treated to remove the relatively high starch fraction and to concentrate the relatively high protein fraction thereof, obtaining a fraction which contains in excess of about 20% protein and most desirably in excess of 22% protein.

In treating these oat groats to obtain the special stabilizer desired the groats are ground to such an extent that at least 50% and desirably 80% to 90% will pass through a screen or mesh or bolting cloth having a fineness in excess of about 60 mesh and desirably having a fineness in excess of 70 mesh.

The oat groats are ground as indicated above and the ground groats are then separated as by aspirating or screening into two fractions, namely, a coarse fraction and a fine fraction, the coarse fraction comprising the minor fraction of less than 50% by weight and desirably comprising 10% to 20% of the total weight of the ground oat groats and the fine fraction comprising over 50% and desirably between 80% and 90% of the total weight of the ground oat groats.

It is the coarse residue which is left after such grinding and screening or bolting or after aspirating and which has then been finely divided which is found to contain the properties most desirable for incorporation in ice cream as the stabilizer and the gum and stabilizing effect is most particularly observed after the coarse fraction has all been ground to a fineness of at least 50 mesh and most desirably to at least 60 mesh.

This effect is not evident or evidenced when the whole oats are ground and utilized as such or when the oat flour made by grinding oat groats is utilized as such because of the fact that other constituents therein greatly lessen, diminish or render ineffective the unusual stabilizing or gummy properties of the ground, relatively high protein and relatively low starch containing dehulled oat fraction of the present invention.

In the preferred procedure the oat groats, after removal of the hulls by milling processes, are pulverized or ground and then by aspirating, bolting or screening the relatively high starch containing oat fraction is removed. The pulverized oat groats may, for example, be aspirated to separate the minor fraction of the relatively low starch and relatively high protein containing material. This process may where desired be continued by regrinding, rescreening or reaspirating until the relatively high starch material has been largely removed leaving the relatively high protein fraction behind desirably to be ground to at least 60 mesh for use in accordance with the procedures of the present invention.

The coarse fraction obtained will generally have a protein content in excess of 20% and more desirably in excess of 22%. At the same time the starch content of the coarse fraction will be reduced to much less than the starch content of the fine fraction. For example, the starch content of the coarse fraction will be about 5% to 10% or more less than the starch content of the fine fraction.

The fraction which is relatively high in starch and relatively low in protein and which is left after the production of this ice cream stabilizer will contain about 14% to 16% protein or less.

According to one preferred method of separating the relatively high starchy fraction which is necessary to obtain the gelatinous properties in most highly developed condition, the oat groats are ground or pulverized so that a major proportion thereof, say at least 50% to 80%, will have a fineness in excess of about 60 mesh and desirably at least 60% to 70% of the ground material will have a sufficient fineness to go through about a 90 mesh screen.

Then the pulverized material is screened, preferably by aspirating or placing through a fine silk screen to remove all particles which will not go through about a 60 mesh screen.

A most highly desirable method is to grind the oat groats until over 75%, such as between 75% and 95% and desirably between 80% and 90% will go through a 70 mesh screen but wherein the balance of between 5% and 25% and desirably between 10% and 20% remains on the screen. Then the ground groats are aspirated or screened to remove all the coarse particles and to separate the fine fraction comprising 75% to 95% and desirably 80% to 90% from the coarse fraction comprising the balance of 5% to 25% and desirably 10% to 20% which coarse fraction is used in accordance with the procedures of the present invention.

The oat material which goes through the screen or the fine material which is aspirated will contain the relatively high starch fraction whereas the material left behind on the screen or the coarse fraction thereof will be relatively low in starch content.

This coarse, relatively low starch and relatively high protein material is then finely divided and may then be used in accordance with the procedures of the present invention, the unusual stabilizing properties now being present with the removal of the cellulosic hulls and the relatively high starch fraction of the oat groats and being particularly adaptable for use as a stabilizer in an ice cream composition when combined with a polyhydric alcohol ester or similar product.

These coarser particles in which the stabilizing properties are concentrated are most desirably ground or pulverized such as in a hammer or stone mill to a particle size of at least 50 mesh and more desirably so that all of the coarse particles will go through at least a 60 mesh screen. This may be accomplished by first grinding the coarse particles and separating that fraction which will go through a 60 or more mesh screen followed by regrinding the remaining coarse portion and continuing the grinding and separating until all of the coarse fraction has been ground to a point where the entire coarse fraction will go through at least a 60 mesh screen.

Moreover, the stabilizing action given by this particular fraction of oats is given by neither the oat flour produced by grinding the oat groats nor by starch.

Moreover, the product produced in accordance with the present invention has not been found replaceable by any other fraction of oats, or by any other type of cereal or its fractions, including wheat or its fractions, corn or its fractions, barley or its fractions, rye or its fractions, rice or its fractions, or other types of cereals which the applicant has carefully studied.

Furthermore, where oat flour which is made by grinding oat groats is dispersed in an unfrozen ice cream mix, it has the tendency to "ball" or to form agglomerated particles which makes it difficult to add to a liquid ice cream mix because the oat flour frequently becomes coated on the homogenizer screen. However, this particular fraction of oats described in the present invention has the distinct advantage of being more readily dispersible in the ice cream mix.

Although the chemical composition of the finely divided coarse fraction may vary it has been found that 20% protein should be present and most desirably 22% protein. Highly desirable materials have been made containing 25% to 29% protein.

It has been found possible, where desired, to bleed this special oat fraction with chlorine or hypochlorite to lighten its color. It is also possible to obtain this bleaching effect with reducing agents such as sulfites but these reducing agents are not as effective as the oxidizing bleaching agents.

The combination of the special oat fraction herein described and the mono glyceride or di glyceride or polyhydric alcohol ester exerts a very different effect when utilized as a stabilizer for ice cream compositions than does, for example, a combination of gelatin and a mono glyceride or di glyceride or polyhydric alcohol ester. The whipping, for example, of the gelatin and glyceride is very much slower than that of a proportionate or like amount of the special oat fraction and the glyceride.

There appears to be a special relationship or co-action which takes place when the special oat fraction and the glyceride are used in combination which produces finer body and texture, faster overrun, and greater replacement of egg yolk than any other combination of other stabilizers such as gelatin with these mono or di glycerides or polyhydric alcohol esters.

For example, the rate of increase in overrun by the use of a combination of, for example, 0.1% glyceride (for which definition see below) and 0.4% special oat fraction is very much greater than the rate of increase in overrun obtained by the use of 0.1% glyceride and 0.4% gelatin. This is particularly surprising in view of the fact that normally the gelatin supplies a great deal more overrun than does the special oat fraction when used by itself so apparently there is some special interaction between the special oat fraction and the glyceride which produces this remarkable increase in overrun as well as the exceptionally fine body and texture and other physical characteristics referred to above.

Furthermore, it has been found, for example, that the use of between about 0.05% and 0.25% of glyceride with between about 0.3% and 0.5% of the special oat fraction in an ice cream mix produces as much overrun as is obtained by the use of between about 0.2% and 0.6% of egg yolk with between about 0.3% and 0.5% of the special oat fraction. The replacement value for egg yolk is of particular importance in view of the high cost of egg yolk and of the difficulties attendant upon its availability.

It has also been found that, for example, a combination of 0.4% gelatin and 0.1% glyceride (which term as used in this application refers particularly to the mono glycerides and di glycerides as well as to the polyhydric alcohol esters) requires a whipping time of at least about 25% greater than 0.4% of the special oat fraction and 0.1% of glyceride.

Where the glyceride is used in combination with gelatin, for example, it has been found that approximately double the amount of glyceride is normally required to produce an ice cream within the same time period required for whipping or to produce the same overrun as is obtained by the use of half the amount of glyceride in combination with the special oat fraction. In other words, a combination of 0.4% gelatin and 0.2% glyceride in an ice cream mix will whip within about the same time as a combination of 0.4% of the special oat fraction and 0.1% of the glyceride.

It is desirable to combine in accordance with the procedures of the present invention a minor amount of the mono glyceride or di glyceride or polyhydric alcohol ester, with a major amount of the special oat fraction. For example, between 1 and 10 parts and preferably between 2 and 5 parts of the glyceride may be combined with each 10 parts of the special oat fraction to be used as the stabilizer in the manufacture of the ice cream.

The combination of the special oat fraction and the stabilizer is desirably added to the ice cream mix while the mix is still cool and at a temperature of not exceeding 100° F.

For example, all of the ice cream ingredients are first added to the pasteurizer and then while the mix is still cool and before pasteurizing the combination of the glyceride and the finely divided special oat fraction is added. Desirably, this combination may be mixed with about 4 parts of its weight of dry sugar followed by adding to the ice cream mix. The pasteurization temperature to which the ice cream mix containing the glyceride and the finely divided special oat fraction is subjected may be between about 145° F. and 165° F. for about 30 minutes and preferably the higher temperature ranges of 160° F. to 170° F. for about 30 minutes are employed.

The combination of the glyceride and finely divided special oat fraction is thoroughly distributed throughout the body of the ice cream mix in order to obtain a thorough dispersal of the glyceride and finely divided special oat fraction in the mix and so as to prevent any particles of the combination of the glyceride and the finely divided special oat fraction from being deposited upon the homogenizer screen. The ice cream mix containing the glyceride and the finely divided special oat fraction is then homogenized such as at about 1500 to 2500 pounds pressure following which the ice cream mix is cooled and frozen in either the usual type of continuous or batch freezer, the freezing being accompanied by agitation so as to incorporate sufficient air to produce about 80% to 110% of over-run.

The combination of the glyceride and the finely divided special oat fraction is added to the ice cream mix in a small amount of less than 2% and preferably less than 1% and desirably between 0.35% and 0.75% against the weight of the ice cream mix. The preferred amount to use is 0.5% by weight against the total weight of the mix, that is against the total weight of all the ice cream ingredients such as the milk, sugar, flavoring and other materials used. For example, between 3½ pounds and 7½ pounds and preferably 5 pounds of the combination of glyceride and finely divided special oat fraction is added to each 1000 pounds of ice cream mix.

Among the ingredients that may be used in the ice cream mix are included the usual dairy products such as cream, milk, butter, butterfat, condensed milk, condensed skim milk, skim milk powder, whole milk powder, etc. and also water, sugars such as sucrose, dextrose, corn syrup, honey, etc. flavoring materials such as vanilla, chocolate, cocoa, nuts, fruits and other flavors both natural and synthetic and also artificial color where desired.

The ice cream will contain by weight between about 10% and 15% of butterfat and generally between about 12% and 13.5% of butterfat. The total amount of milk solids not fat will amount to between about 8% and 12% and generally between about 10% and 11.5%.

By using the combination of glyceride and finely divided special oat fraction of the present invention the finished ice cream will have a highly desirable viscosity both when the ice cream mix is freshly made and also after aging. A distinct advantage of using the combination of glyceride and finely divided special oat fraction of the present invention is that the viscosity will not be so high as to retard cooling after homogenizing as is observed by the use of other stabilizers such as sodium alginate.

In addition to adding the combination of the glyceride and finely divided special oat fraction to an ice cream mix as an ingredient and stabilizer, the combination of the glyceride and finely divided special oat fraction may also be used for addition in a similar manner to ice milk which is subject to the same problems and is processed in the same manner as ice cream. Ice milk will normally contain the same approximate content of milk solids not fat, namely, between about 8% and 15% by weight but the butterfat content will be much less than the butterfat content of ice cream and will approximate between about 4% and 6.5% of butterfat.

Since both ice cream and ice milk carry some butterfat content and since they both contain relatively large amounts of milk solids not fat as indicated above they are both subject to ice and lactose crystal formation and to problems of obtaining desirable viscosity, body and texture and proper physical characteristics when held in the dealers' cabinets over normal periods of time.

The combination of the glyceride and finely divided special oat fraction obtained by the present invention is used in ice milk in the same amount indicated for ice cream and will give similar desirable physical characteristics to the ice milk.

By the term "mix ingredients" as used in the present application there are included the usual ingredients employed in the manufacture of ice cream and ice milk such as cream, milk, butter, condensed milk products, powdered milk products, sugars, water, flavoring, fruits, etc.

Where desired, the fat may be extracted from the finely divided special oat fraction such as by treatment of the special oat fraction or of the finely divided special oat fraction with a fat solvent. Among the fat solvents that are desirably used are included the volatile hydrocarbon solvents such as benzine, hexane, N-pentane, etc., as well as acetone which has been found highly satisfactory. There may also be very desirably used the low molecular weight aliphatic alcohols, particularly isopropyl alcohol but including also methanol, ethanol or propanol.

Among the other solvents that may be employed are carbon tetrachloride, carbon disulphide, dichlorethylene, trichlorethylene, dichlorethylether or similar fat solvents or combinations of any of the above may also be employed. Other fat soluble solvents may also be utilized and it is desirable for a maximum amount of the fat to be removed as would be done in any normal commercial procedure.

It is considered preferable to extract the special coarse oat fraction prepared in the manner indicated above although the coarser particles may first be ground before subjecting to fat extraction. The extracted product is very readily pulverized to the desired point of at least about 75 mesh and desirably to about 90 mesh.

The glyceride referred to in the present application includes the mono glycerides or di glycerides or minor amounts of polyhydric alcohols in which at least one of the hydroxyl groups is free and in which at least one of the hydroxyl groups is replaced by a fatty acid radical or minor amounts of polyhydric alcohol esters. For example, the special oat fraction may be combined with a mono- or di-glyceride or with such polyhydric alcohol esters as glyceryl-mono-oleate, glyceryl-monostearate, glyceryldistearate, diethylene glycol (mono or di) stearate, diethylene glycol (mono) oleate or any similar ester of a polyhydric alcohol having at least one free hydroxyl group.

The above polyhydric alcohol esters may be mixed mechanically with the special oat fraction but preferably a paste or aqueous dispersion is prepared in which the special oat fraction is dispersed in water such as in from 5 to 15 parts of water for each 1 part of the finely divided special oat fraction followed by adding thereto the polyhydric alcohol ester or similar composition, which combination is then placed through a colloid mill or homogenizer to thoroughly disperse the polyhydric alcohol ester therethrough followed preferably by drying as on a drum drier or by tray drying or by similar dehydration to produce a composite mass in which the polyhydric alcohol ester is thoroughly dispersed in and through the special oat fraction.

Where the combination is dried as on a drum drier, for example, it is preferable for the drying to be conducted in such manner that the temperature of the dried particles does not exceed 170° F. and preferably does not exceed 150° F. Under these circumstances, the drying is desirably conducted by vacuum drum drying or less desirably by spray drying.

Whereas normally these polyhydric alcohol esters "oil off" or come to the surface when added to any ice cream composition and thereby present a major difficulty when trying to obtain a uniform dispersion of the esters through the ice cream composition, where the polyhydric alcohol ester is first combined with the special oat fraction of the present invention an unusual colloid appears to be formed whereby the polyhydric alcohol ester is uniformly dispersed throughout the ice cream composition and remains dispersed therethrough without the oily composition coming to the surface and without "oiling off." This effect of retarding "oiling off" of the glyceride by combining with the special oat fraction is particularly valuable in the treatment of aqueous compositions such as the ice cream and ice milk of the present invention.

It has furthermore been found that a synergistic effect is obtained on combining the polyhydric alcohol esters with the special oat fraction of the present invention whereby the relative efficiency of the polyhydric alcohol ester is materially increased when combined with the special oat fraction of the present invention over that obtained where the polyhydric alcohol ester is combined with gelatin or similar stabilizer.

Where desired, the special oat fraction may first be dispersed in water such as when using 1 part of the special oat fraction to between 4 and 10 parts of water followed by allowing the combination to stand for a short period of time such as up to about several hours and then followed by drying and pulverizing whereby the full stabilizing effect of the special oat fraction will have been developed and where no further time period will be required to develop the maximum stabilizing activity. During the time that the special oat fraction is allowed to stand in water an elevated temperature may be employed such as up to about 175° F.

By the term "total protein" is meant the total amount of protein present in the special oat fraction of the present invention.

By the term "finely divided" as used in connection with the special oat fraction of the present invention and claims is meant the oat fraction which has been subdivided to a state of fineness that will enable it to go through at least about a 50 mesh screen.

By the term "dry milled oat product" as used in the present application and claims is meant an oat product which has been subjected to either grinding, screening, bolting, aspirating or combinations thereof or even to oil solvent extraction but wherein the oat product has been processed in the substantial absence of water.

The combination of the special oat fraction and the glyceride of the present invention has been found to be highly desirable for other purposes such as in the sizing of textiles and textile yarns to prevent fuzziness and to smoothen the surface of the textile yarn as well as in the preparation of cosmetics, drugs, dentifrices and food products particularly where emulsification of those food products or emulsification of those drums are involved. The synergistic effect produced by the combination of the special oat fraction and the glyceride is particularly valuable where aeration of the final product is desired along with high viscosity and where physical stabilization effects are required.

Together with or in lieu of the special oat fraction, there may also be employed sodium carboxy methylcellulose particularly as a stabilizer for ice cream. For example, combinations of between 1 part and 10 parts and desirably about 5 parts of sodium carboxy methylcellulose to each 20 parts of the special oat fraction of the present invention when used as a stabilizer in the manufacture of ice cream as well as of other food products produce unusually high viscosity not obtained by the use of the special oat fraction or of sodium carboxy methylcellulose alone.

It has also been found that a combination of sodium carboxy methylcellulose and the special oat fraction or a combination of sodium carboxy methylcellulose and a mono or diglyceride or polyhydric alcohol ester as described herein increases viscosity in much greater proportion than sodium carboxy methylcellulose with other cereal products, indicating an unusual compatibility between sodium carboxy methylcellulose and the special oat fraction.

Together with or in lieu of the special oat fraction there may also be employed molasses extracts and particularly molasses residues obtained after removal of a large part or all of the sugars contained in molasses particularly by conversion of the sugars into alcohol. There may also be utilized together with or in lieu of the special oat fraction, extracts produced from molasses or from molasses residues obtained after removal of a large part or all of the sugars contained in molasses particularly by conversion of the sugars into alcohol, which extracts may be made, for example, by the addition of an alcohol, particularly a lower aliphatic alcohol in a sufficient amount to have present at least about 6 parts of the alcohol to each 4 parts of water followed by removal of the precipitated material, drying and, where desired, grinding to a relatively fine mesh. Together with or in lieu of alcohol, a metallic soluble salt such as nickel sulphate, nickel ammonium sulphate, nickel chloride or nickel carbonate or similar soluble salt of copper, zinc, manganese, cobalt or silver, may be added to the molasses or molasses residue followed by filtration or removal of the precipitated material, and, where desired, followed by leaching out with a 60% or more alcohol solution. A zeolite, particularly a hydrogen zeolite may similarly be used in the treatment of the molasses or molasses residue. These molasses extracts or extracts of molasses residues may be used alone or in combination with the special oat fraction and/or the mono or di glyceride or polyhydric alcohol ester as a gum and stabilizer for ice cream, food products such as mayonnaise, cake icings, margarine, etc. or for cosmetics, yarns and textiles, paper, pharmaceutical products, etc.

The present application is a continuation in part of applications, Serial No. 510,831 filed November 17, 1943 entitled Oat product, now Patent No. 2,355,028, Serial No. 534,165 filed May 4, 1944 entitled Ice cream composition now Patent No. 2,355,032 and through said applications continues the subject matter of applications, Serial No. 463,651 filed October 28, 1942 entitled Ice cream compositions and Serial No. 401,967 filed July 11, 1941 entitled Water thickening agent.

Having described my invention, what I claim is:

1. A composition selected from the group consisting of ice cream and ice milk, said composition comprising as an ingredient a small amount of a combination of a polyhydric alcohol ester having at least one free hydroxyl group and a finely divided, dry milled oat product, said oat product containing in excess of about 20% total protein and said oat product having a relatively low starch and a relatively high protein content as compared to dehulled oats.

2. An ice cream composition comprising as an ingredient a small amount of less than 1% of a combination of a polyhydric alcohol having at least one free hydroxyl group and in which at least one of the hydroxyl groups is replaced by a fatty acid radical and a dry milled oat product having a fineness of at least about 60 mesh, said oat product containing in excess of about 20% total protein and said oat product having a relatively low starch and a relatively high protein content as compared to dehulled oats.

3. A composition selected from the group consisting of ice cream and ice milk, said composition comprising as an ingredient about 0.5% by weight of a combination of a polyhydric alcohol having at least one free hydroxyl group and in which at least one of the hydroxyl groups is replaced by a fatty acid radical and the coarse fraction of dehulled oats, said fraction having a fineness of at least about 60 mesh, said fraction containing in excess of about 22% total protein, said fraction being free of those particles which will go through a 60 mesh screen when the dehulled oats are pulverized to a fineness that will permit about 80% to 90% thereof to pass through a 60 mesh screen.

4. An ice cream composition comprising as an ingredient a small amount of less than 1% of a combination of a polyhydric alcohol ester having at least one free hydroxyl group and the finely divided coarse fraction of dehulled oats, said fraction containing in excess of about 22% total protein, said fraction being free of those particles which will go through a 60 mesh screen when the dehulled oats are pulverized to a fineness that will permit about 80% to 90% thereof to pass through a 60 mesh screen.

5. An ice cream comprising as an ingredient a small amount of a combination of a polyhydric alcohol having at least one free hydroxyl group and in which at least one of the hydroxyl groups is replaced by a fatty acid radical and the finely divided coarse fraction of dehulled oats, said finely divided coarse fraction being substantially free of those particles which will go through a 60 mesh screen when the dehulled oats are pulverized to a fineness that will permit a major proportion thereof to pass through a 60 mesh screen.

6. An ice cream comprising as an ingredient a small amount of less than 1% of a combination of a polyhydric alcohol having at least one free hydroxyl group and in which at least one of the hydroxyl groups is replaced by a fatty acid radical and the finely divided coarse fraction of dehulled oats, said finely divided coarse fraction being substantially free of those particles which will go through a 60 mesh screen when the dehulled oats are pulverized to a fineness that will permit about 80% to 90% thereof to pass through a 60 mesh screen.

7. A method of producing a composition selected from the group consisting of ice cream and ice milk, which comprises adding as an ingredient to the mix ingredients of a product selected from the group consisting of ice cream and ice milk and thoroughly distributing therethrough a small amount of a combination of a polyhydric alcohol ester having at least one free hydroxyl group and the finely divided coarse fraction of dehulled oats, said finely ground coarse fraction being substantially free of those particles which will go through a 60 mesh screen when the dehulled oats are pulverized to a fineness that will permit a major proportion thereof to pass through a 60 mesh screen, and then pasteurizing and freezing the composition.

8. A method of producing an ice cream composition which comprises adding as an ingredient to an ice cream mix and thoroughly distributing therethrough a small amount of less than 1% of a combination of a polyhydric alcohol ester having at least one free hydroxyl group and the finely divided coarse fraction of dehulled oats, said finely divided coarse fraction being substantially free of those particles which will go through a 60 mesh screen when the dehulled oats are pulverized to a fineness that will permit about 80% to 90% thereof to pass through a 60 mesh screen, said finely divided coarse fraction containing in excess of about 20% total protein, and then pasteurizing the ice cream mix.

9. A method of producing an ice cream composition which comprises adding as an ingredient to an ice cream mix and thoroughly distributing therethrough a small amount of less than 1% of a combination of a polyhydric alcohol having at least one free hydroxyl group and in which at least one of the hydroxyl groups is replaced by a fatty acid radical and the finely divided coarse fraction of dehulled oats, said finely divided coarse fraction being substantially free of those particles which will go through a 60 mesh screen when the dehulled oats are pulverized to a fineness that will permit about 80% to 90% thereof to pass through a 60 mesh screen, said finely divided coarse fraction containing in excess of about 20% total protein, and then pasteurizing the ice cream mix at a temperature of at least about 160° F. for about 30 minutes.

10. A method of producing an ice cream which comprises adding as an ingredient to an ice cream mix and thoroughly distributing therethrough a small amount of less than 1% of a combination of a polyhydric alcohol ester having at least one free hydroxyl group and a dry milled oat product having a fineness of at least about 60 mesh, said oat product containing in excess of about 20% total protein and said oat product having a relatively low starch and a relatively high protein content as compared to dehulled oats, and then pasteurizing and freezing the ice cream mix.

11. An ice cream and ice milk stabilizer comprising a polyhydric alcohol having at least one free hydroxyl group and a finely divided, dry milled oat product, said oat product containing in excess of about 20% total protein and said oat product having a relatively low starch and a relatively high protein content as compared to dehulled oats.

12. An ice cream and ice milk stabilizer comprising a polyhydric alcohol having at least one free hydroxyl group and in which at least one of the hydroxyl groups is replaced by a fatty acid radical and the coarse fraction of dehulled oats, said fraction having a fineness of at least about 60 mesh, said fraction containing in excess of about 20% total protein, said fraction being free of those particles which will go through a 60 mesh screen when the dehulled oats are pulverized to a fineness that will permit about 80% to 90% thereof to pass through a 60 mesh screen.

13. An ice cream and ice milk stabilizer comprising a combination of between 1 and 10 parts of a polyhydric alcohol ester having at least one free hydroxyl group and in which at least one of the hydroxyl groups is replaced by a fatty acid radical, to each 10 parts of a finely divided, dry milled oat product, said oat product containing in excess of about 20% total protein and said oat product having a relatively low starch and a relatively high protein content as compared to dehulled oats.

SIDNEY MUSHER.